(12) United States Patent
Rosen et al.

(10) Patent No.: US 10,895,517 B2
(45) Date of Patent: Jan. 19, 2021

(54) MULTI-WAVELENGTH WAVEFRONT SYSTEM AND METHOD FOR MEASURING DIFFRACTIVE LENSES

(71) Applicant: AMO Groningen B.V., Groningen (NL)

(72) Inventors: Robert Rosen, Groningen (NL); Mihai State, Groningen (NL); Marrie van der Mooren, Groningen (NL); Mengchan Sun, Groningen (NL); Hendrik A. Weeber, Groningen (NL); Tjeerd Zuidema, Groningen (NL)

(73) Assignee: AMO Groningen B.V., Groningen (NL)

( * ) Notice: Subject to any disclaimer, the term of this patent is extended or adjusted under 35 U.S.C. 154(b) by 0 days.

(21) Appl. No.: 16/271,706

(22) Filed: Feb. 8, 2019

(65) Prior Publication Data

US 2019/0242781 A1 Aug. 8, 2019

Related U.S. Application Data

(60) Provisional application No. 62/628,213, filed on Feb. 8, 2018.

(51) Int. Cl.
*G01J 3/02* (2006.01)
*G01M 11/02* (2006.01)
(Continued)

(52) U.S. Cl.
CPC ...... *G01M 11/025* (2013.01); *G01M 11/0242* (2013.01); *G01N 21/4788* (2013.01); *G01N 21/958* (2013.01); *G01N 2021/9583* (2013.01)

(58) Field of Classification Search
CPC ............ G01M 11/025; G01M 11/0242; G01N 21/958; G01N 21/4788; G01N 2021/9583; A61F 2/16
See application file for complete search history.

(56) References Cited

U.S. PATENT DOCUMENTS 6,460,997 B1 10/2002 Frey et al.
6,497,483 B2 12/2002 Frey et al.
(Continued)

FOREIGN PATENT DOCUMENTS

EP 0538126 B1 9/1996
EP 3059575 A1 8/2016
(Continued)

OTHER PUBLICATIONS

Calatayud A., et al., "Imaging Quality of Multifocal Intraocular Lenses: Automated Assessment Setup," Ophthalmic and Physiological Optics, Jul. 2013, vol. 33 (4), pp. 420-426.
(Continued)

*Primary Examiner* — Abdullahi Nur
(74) *Attorney, Agent, or Firm* — Johnson & Johnson Surgical Vision, Inc.

(57) ABSTRACT

A multi-wavelength wavefront system and method for measuring diffractive lenses. A system may include one or more light sources configured to emit a plurality of wavelengths of light for diffraction by a diffractive lens. A light sensor may be configured to receive the light that is diffracted by the diffractive intraocular lens. A processor may be configured to determine one or more of the plurality of wavelengths that have a peak diffraction efficiency for the diffractive intraocular lens based on the light received by the light sensor.

20 Claims, 10 Drawing Sheets

(51) Int. Cl.
*G01N 21/958* (2006.01)
*G01N 21/47* (2006.01)

(56) References Cited

U.S. PATENT DOCUMENTS

| | | | |
|---|---|---|---|
| 6,575,572 | B2 | 6/2003 | Lai et al. |
| 6,609,793 | B2 | 8/2003 | Norrby et al. |
| 6,750,958 | B1 | 6/2004 | Fantone et al. |
| 7,659,971 | B2 | 2/2010 | Warden et al. |
| 7,938,538 | B2 | 5/2011 | Lu et al. |
| 7,944,553 | B1 | 5/2011 | Simpson et al. |
| 7,969,585 | B2 | 6/2011 | Neal et al. |
| 8,913,236 | B2 | 12/2014 | Vankerkhove |
| 9,700,201 | B2 | 7/2017 | Bex et al. |
| 2002/0122172 | A1 | 9/2002 | Ross, III et al. |
| 2003/0033013 | A1 | 2/2003 | Callahan et al. |
| 2005/0024647 | A1 | 2/2005 | Montgomery |
| 2006/0203198 | A1 | 9/2006 | Liang |
| 2006/0244906 | A1 | 11/2006 | Piers et al. |
| 2006/0279699 | A1 | 12/2006 | Liang |
| 2006/0279700 | A1 | 12/2006 | Liang |
| 2007/0002444 | A1* | 1/2007 | Piers .............. G02B 5/1814 359/565 |
| 2007/0139640 | A1 | 6/2007 | Biel et al. |
| 2007/0236701 | A1* | 10/2007 | Neal .............. A61B 3/1005 356/512 |
| 2007/0273983 | A1* | 11/2007 | Hebert .............. G02B 5/1895 359/708 |
| 2008/0033546 | A1 | 2/2008 | Liang |
| 2009/0000628 | A1 | 1/2009 | Somani et al. |
| 2010/0097569 | A1 | 4/2010 | Weeber et al. |
| 2010/0220185 | A1 | 9/2010 | Vertoprakhov et al. |
| 2011/0211163 | A1 | 9/2011 | Meuse et al. |
| 2012/0238904 | A1 | 9/2012 | Manns et al. |
| 2012/0300196 | A1 | 11/2012 | Copland |
| 2012/0314187 | A1* | 12/2012 | Farrer .............. A61B 3/1015 351/221 |
| 2013/0314669 | A1 | 11/2013 | Levin et al. |
| 2014/0092395 | A1 | 4/2014 | Fechner et al. |
| 2014/0176904 | A1 | 6/2014 | Lai |
| 2015/0131053 | A1 | 5/2015 | Copland et al. |
| 2015/0379348 | A1 | 12/2015 | Whritenor et al. |
| 2018/0236737 | A1 | 8/2018 | Dean |
| 2019/0195730 | A1 | 6/2019 | Fechner et al. |

FOREIGN PATENT DOCUMENTS

| | | |
|---|---|---|
| GB | 2433782 A | 7/2007 |
| GB | 2488802 A | 9/2012 |
| WO | 0189424 A1 | 11/2001 |
| WO | 02074210 A2 | 9/2002 |
| WO | 2004079637 A1 | 9/2004 |
| WO | 2005079546 A2 | 9/2005 |
| WO | 2007142981 A2 | 12/2007 |
| WO | 2010028654 A1 | 3/2010 |
| WO | 2012166797 A1 | 12/2012 |
| WO | 2016032397 A1 | 3/2016 |
| WO | 2016087914 A1 | 6/2016 |

OTHER PUBLICATIONS

International Search Report and Written Opinion for Application No. PCT/EP2019/053213, dated Apr. 26, 2019, 15 pages.

Abrahamsson M., et al., "Impairment of Contrast Sensitivity Function (CSF) as a Measure of Disability Glare, " Investigative Ophthalmology & Visual Science, Jul. 1986, vol. 27 (7), pp. 1131-1136.
Aslam, T.M., et al., "Development of a Forced Choice Photographic Questionnaire for Photic Phenomena and Its Testing—Repeatability, Reliability and Validity, " Ophthalmologica, Nov.-Dec. 2004, vol. 218 (6), pp. 102-410.
Beer J.M., et al., "Lasers' Spectral and Temporal Profile Can Affect Visual Glare Disability," Aviation, Space, and Environmental Medicine, Dec. 2012, vol. 83 (12), pp. 1135-1144.
Fernandez E.J., et al., "Adaptive Optics Visual Simulator," Journal of Refractive Surgery, 2002, vol. 18 (5), pp. S634-S638.
Guirao A., et al., "Corneal Wave Aberration from Videokeratography: Accuracy and Limitations of the Procedure," Journal of the Optical Society of America, 2000, vol. 17 (6), pp. 955-965.
Javitt J.C., et al., "Validity and Reliability of the Cataract TyPE Spec: an Instrument For Measuring Outcomes of Cataract Extraction," American Journal of Ophthalmology, Aug. 2003, vol. 136 (2), pp. 285-290.
Jendritza B.B., et al., "Wavefront-Guided Excimer Laser Vision Correction after Multifocal IOL Implantation," Journal of Refractive Surgery, Mar. 2008, vol. 24 (3), pp. 274-279.
Johnson C.A., "Psychophysical Factors that Have Been Applied to Clinical Perimetry," Vision Research, Sep. 2013, vol. 90, pp. 25-31.
Lesmes L.A., et al., "Bayesian Adaptive Estimation of the Contrast Sensitivity Function: the Quick CSF Method,"Journal of Vision, Mar. 2010, vol. 10 (3) 17, pp. 1-21.
Morlock, R., et al., "Patient-Reported Spectacle Independence Questionnaire (PRSIQ): Development and Validation, "American Journal of Ophthalmology, Jun. 2017, vol. 178, pp. 101-114.
Ortiz, C., et al., "Quantification and Monitoring of Visual Disturbances for patients with cataracts using Halo v1.0 software, " Department of Optics, Laboratory of Vision Sciences and Applications, University of Granada, IWBBIO 2013, Mar. 20, 2013, XP055596332, Proceedings, 8 Pages.
Rosen R.,et al., "A Bayesian Method Using through Focus Visual Acuity to Predict Rates of Spectacle Wear for Pseudophakic patients," Investigative Opthalmology & Visual Science, Jul. 2018, vol. 59 (9), pp. 1075, ARVO Annual Meeting Abstract, Retrieved from the Internet: (URL: https://iovs.arvojournals.org/article.aspx?articled=2693341&resultClick=1).
Vitale S., et al., "The Refractive Status and Vision Profile: A Questionnaire to Measure Vision-Related Quality of Life in Persons with Refractive Error," Ophthalmology, Aug. 2000, vol. 107 (8), pp. 1529-1539.
Weeber H.A., et al., "Influence of Corneal Aberrations on Dysphotopsia with Multifocal IOLs," ARVO, 2011, Abstract.
Weeber H.A., et al., "Influence of Corneal Aberrations on Dysphotopsia with Multifocal IOLs," RD3115, 2011.
Weeber H.A., et al., "Optical and Visual Performance of Patient Populations Implanted with Monofocal and Multifocal IOLs in the Presence of Defocus," Investigative Ophthalmology & Visual Science, 2010, vol. 51, E-Abstract 5751.
Weeber H.A., et al., "Population-based Visual Acuity in the Presence of Defocus Well Predicted By Classical Theory," Journal of Biomedical Optics, 2010, vol. 15 (4), pp. 040509.
Weeber H.A., et al., "Theoretical Performance of Intraocular Lenses Correcting Both Spherical and Chromatic Aberration," Journal of Refractive Surgery, 2012, vol. 28 (1), pp. 48-52.
Jaeken B., et al., "Peripheral Aberrations in the Human Eye for Different Wavelengths: Off-Axis Chromatic Aberration," Journal of the Optical Society of America A, 2011, vol. 28 (9), pp. 1871-1879.

* cited by examiner

MULTI-WAVELENGTH WAVEFRONT SYSTEM AND METHOD FOR MEASURING DIFFRACTIVE LENSES

CROSS-REFERENCE TO RELATED APPLICATIONS

This application claims the benefit under 35 U.S.C. § 119(e) of U.S. Provisional Patent Application No. 62/628,213, filed Feb. 8, 2018, which is incorporated herein by reference in its entirety.

BACKGROUND

Lenses, particularly intraocular lenses, may suffer from defects produced in the manufacturing process or other defects.

Methods of determining optical quality of lenses have been provided. Such methods include determining total power in air, in which the focus of an incident plane wavefront in air is located, which can be directly correlated to power in water and therefore power in the eye.

Other methods include determining image quality in air, which is determined through imaging of fixed target and evaluating parameters in a CCD image for (e.g.) resolution and contrast. Such a system might inadequately represent quality in the eye (for an intraocular lens), since diffraction efficiency and spherical aberration differ.

Other methods include determining image quality in water, which is determined by placing the lens in a wet cell and determining the image quality on a CCD. The resultant image can be translated to various image quality metrics, such as MTF. This measurement adequately represents image quality, but is cumbersome and time consuming.

Other methods include wavefront aberrations in air or water. Using a Hartmann-Shack wavefront sensor, the Zernike coefficients of a lens can be determined. This can be compared against the expected wavefront aberrations for any design, and for refractive designs the deviations are a good predictor of image quality.

These methods, however, all measure the total quality of the lens, and not a particular surface of the lens. Methods have been developed to measure quality of a surface of the lens, but they are all time-consuming and cumbersome and suffer from substantial uncertainties (e.g., confocal microscopy or interferometry).

In addition, difficulties arise when testing optical quality of diffractive lenses. Wavefront testing is difficult when applied to diffractive lenses. Diffractive lenses direct light to a plurality of diffractive orders. The distribution of light to different orders differs between a lens implanted in the eye with water surrounding it and the same lens measured in air. Additionally, adverse effects such as "spot doubling" may occur when performing wavefront testing on a lens, due to the lens' light being directed to multiple diffractive orders.

Methods have been developed to address the difficulties of wavefront testing in diffractive lenses. One such method is to test in-vitro in water. The testing method assumes that a diffractive lens will have a clear distance peak, and it is hoped for that the distance spot patterns will dominate and light from other diffractive orders will not affect the test. This is risky, and requires the use of water. Further, many aberrometers operate at a different wavelength than the peak one for which lenses (particularly intraocular lenses) are designed.

Another method is to tilt the diffractive lens during wavefront testing, to attempt to avoid the presence of "spot doubling." This method, however, requires manipulation of the lens and may affect the accuracy of the wavefront test.

SUMMARY

There is accordingly a need in the art to measure optical quality of particular surfaces of lenses, in addition to the total quality of the lens.

Improvements in wavefront testing of diffractive lenses are also desired.

Systems, methods, and apparatuses disclosed herein are intended to enhance the quality and efficiency of testing a lens surface. The total quality of the lens may also be tested.

The systems, methods, and apparatuses disclosed herein are also intended to comprise improvements in the field of wavefront testing for diffractive lenses. The methods of testing diffractive lenses may be performed in air, which provides an improvement over water-based methods of wavefront testing.

An intraocular lens surface measurement system according to an embodiment of the present disclosure includes a light source configured to emit light that is reflected off an optical surface of an intraocular lens. A wavefront sensor is configured to receive the light that is reflected off the optical surface of the intraocular lens. A processor is configured to determine one or more characteristics of the optical surface of the intraocular lens based on a wavefront of the reflected light that is received by the wavefront sensor.

A method according to an embodiment of the present disclosure includes reflecting light off of an optical surface of an intraocular lens. The method includes receiving the reflected light with a wavefront sensor. The method includes determining one or more characteristics of the optical surface of the intraocular lens based on a wavefront of the reflected light that is received by the wavefront sensor.

A system according to an embodiment of the present disclosure includes a processor configured to determine one or more characteristics of an optical surface of an intraocular lens based on a wavefront of light that is reflected from the optical surface.

A system according to an embodiment of the present disclosure includes one or more light sources configured to emit a plurality of wavelengths of light for diffraction by a diffractive intraocular lens. A wavefront sensor is configured to receive the light that is diffracted by the diffractive intraocular lens. A processor is configured to determine one or more of the plurality of wavelengths that have a peak diffraction efficiency for the diffractive intraocular lens based on the light received by the wavefront sensor.

A method according to an embodiment of the present disclosure includes applying a plurality of wavelengths of light to a diffractive intraocular lens. The method includes receiving light that is diffracted by the diffractive intraocular lens with a wavefront sensor. The method includes determining one or more of the plurality of wavelengths of light that have a peak diffraction efficiency for the diffractive intraocular lens based on the light received by the wavefront sensor.

A method according to an embodiment of the present disclosure includes determining a wavefront aberration of a diffractive intraocular lens at a wavelength corresponding to a peak diffraction efficiency for the diffractive intraocular lens.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
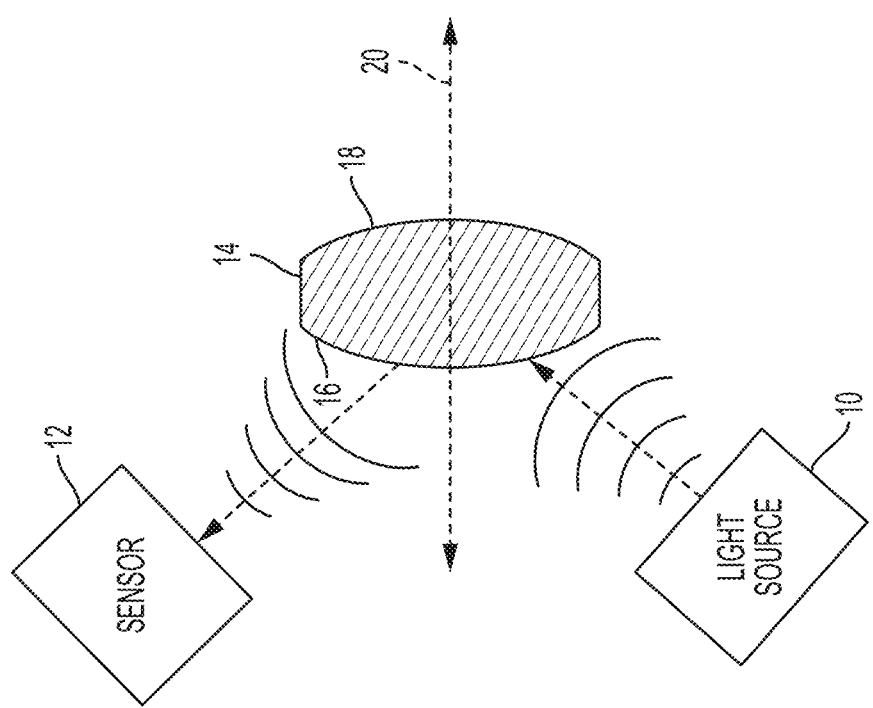
FIG. 1 illustrates a schematic view of a system according to an embodiment of the present disclosure.

FIG. 1 illustrates an embodiment of an intraocular lens surface measurement system. The system may include a light source 10 and a sensor 12. The light source 10 may comprise a device configured to emit light that is reflected off an optical surface of a lens. The light source 10 may comprise a laser, a super luminescent diode, or other form of light source. Preferably, the light source 10 may emit a single wavelength of light. In embodiments, the light source 10 may emit multiple wavelengths of light and may comprise a multi-wavelength lamp, or another form of light source.

The sensor 12 may comprise a light sensor. The sensor 12 may be configured as a wavefront sensor that can measure aberrations of a wavefront incident on the sensor 12. The sensor 12 may be configured to receive light that is reflected off an optical surface of a lens. In one embodiment, the sensor 12 may comprise a Hartmann-Shack wavefront sensor, or a wavefront curvature sensor, one or more interferometers, or a Ronchi test, or other forms of sensors.

The light source 10 and sensor 12 are utilized to measure a lens 14. The lens 14 may have an anterior optical surface 16 and a posterior optical surface 18. The optical surfaces 16, 18 may face opposite each other such that the posterior optical surface 18 is an opposite optical surface of the anterior optical surface 16, and the anterior optical surface 16 is an opposite optical surface of the posterior optical surface 18. The lens 14 may be centered upon an optical axis 20.

The optical surfaces 16, 18 of the lens 14 may have convex shapes (as shown in FIG. 1), and in other embodiments may have combinations of concave, planar, cylindrical, aspheric, or other shapes.

The lens 14 may comprise an intraocular lens. The intraocular lens may be configured to be inserted into the eye of a patient to replace the natural lens of the patient, or to be utilized in combination with the natural lens of the patient. The intraocular lens may comprise a monofocal, or multi-focal intraocular lens, and may be configured to correct the vision of a patient.

The system is configured to determine one or more characteristics of an optical surface of the lens 14. These characteristics may include aberrations of the optical surface of the lens. Such aberrations may include the physical shape of the surface deviating from an intended shape. The profile of the surface may deviate from the intended shape. Such aberrations may include surface deformities produced during the manufacturing process of the lens.

The system is configured to determine the one or more characteristics of an optical surface of the lens 14 by reflecting light off the optical surface of the lens 14 and receiving the reflected light with the sensor 12. The sensor 12 may be configured such that it does not receive light that is transmitted through the lens 14. This process allows the sensor 12 to detect the one or more characteristics of the optical surface without taking into account the characteristics of the opposite optical surface, and without taking into account any variations in the wavefront that may be caused by light transmitted through the internal body of the lens 14.

The light source 10 may be utilized to emit the light that is reflected off the optical surface of the lens 14. The light may be applied at an on-axis angle of incidence to the lens 14. In other embodiments, another angle of incidence may be applied. For example, an angle of incidence ranging between zero and 70 degrees of incidence may be applied in certain embodiments. In other embodiments, other angles of incidence may be applied.

In FIG. 1, light is emitted from the light source 10 and is reflected off the anterior optical surface 16 of the lens 14. The sensor 12 is positioned such that it receives the light reflected off the anterior optical surface 16 of the lens 14. The sensor 12 may be positioned such that it does not receive light that is transmitted through the lens 14. Accordingly, the characteristics of only the anterior optical surface 16 may vary the wavefront of the reflected light received by the sensor 12.

In an embodiment in which the sensor 12 is a wavefront sensor, the sensor 12 may detect the aberrations in the wavefront of light reflected by the anterior optical surface 16.

The position of the light source 10, the direction of the light emitted by the light source 10, and the position of the sensor 12 may be varied to account for the particular surface profile of the anterior optical surface 16. In one embodiment, the angle of the emitted light and the position of the sensor 12 may be varied during the measurement process to account for aspheric or other shapes of the surface of the lens 14. In one embodiment, an automatic feedback system to determine proper angle of the light source 10 and/or sensor 12 may be utilized. In one embodiment, an automatic feedback system may be utilized to rotate the lens 14 to vary the relative angle of the light source 10 and/or sensor 12. In one embodiment, the sensor 12 may be screened or filtered or otherwise blocked such that it does not receive the light that passes through the lens 14.

In one embodiment, the system may be utilized to determine one or more characteristics of the opposite optical surface, or posterior optical surface 18 as shown in FIG. 1, of the lens 14. The lens 14 may be rotated to allow the posterior optical surface 18 to reflect the light emitted by the light source 10. In one embodiment, the light source 10 and sensor 12 may be moved relative to the lens 14 such that they emit and receive light reflected by the posterior optical surface 18. In one embodiment, a second light source 10 and a second sensor 12 may be positioned on the posterior side of the lens 14 to emit and receive light reflected by the posterior optical surface 18. In one embodiment, the path of the light emitted by the light source 10 may be diverted such that it reflects off the opposite optical surface of the lens 14. The path of the light reflected off the opposite optical surface of the lens 14 may also be diverted such that it is received by the sensor 12 after being reflected off the opposite optical surface. The diversion may occur through use of mirrors or the like to divert the light path. The use of mirrors may avoid physical movement of the light source 10, sensor 12, or lens 14.

Figure 3:
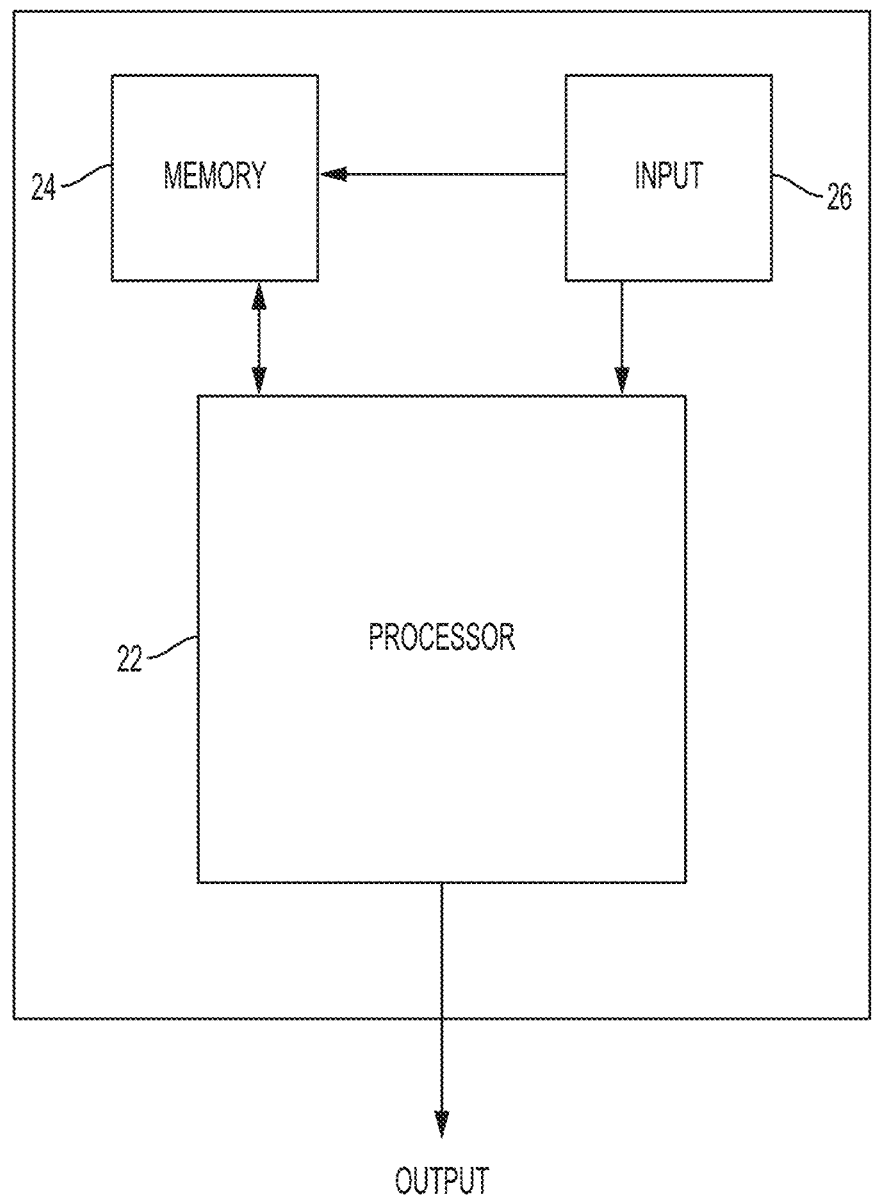
FIG. 3 illustrates a schematic illustration of a processor, memory, and input according to an embodiment of the present disclosure.

A determination may be made of the one or more characteristics of the optical surface of the lens 14 based on the wavefront of the reflected light that is received by the sensor 12. Referring to FIG. 3, a processor 22 may be used in combination with a memory 24 and an input 26. The memory 24 may store data for use by the processor 22 in the operation of the system. The input 26 may comprise an interface between the sensor 12 and the processor 22 (e.g., a port or connector or the like). The processor 22 (shown in FIG. 3) may be configured to make the determination of the one or more characteristics of the optical surface of the lens 14 based on the wavefront of the reflected light that is received by the sensor 12. The processor may make such a determination by processing the information produced by the sensor 12 regarding the wavefront of the light reflected off the optical surface of the lens. The processor 22 may be configured to determine, based on the wavefront information, the type and extent of optical aberrations of the optical surface. The processor may be configured to reconstruct the profile of the optical surface and provide the profile as an output. For example, the processor 22 may operate to determine Zernike polynomials. The processor 22 may perform a reconstruction step based on the wavefront of the reflected light that is received by the sensor 12 to determine the surface properties of optical surface of the lens 14. The processor 22 may combine the reflection wavefront with information regarding the defocus of the incident wavefront. The processor 22 may perform the reconstruction step on both optical surfaces of the lens 14 to reconstruct the surface shape of both optical surfaces. The processor 22 may determine the one or more characteristics of the optical surface of the lens 14 in an iterative process, searching for a surface shape with the highest likelihood of yielding the measured wavefronts. In addition, the processor 22 may calculate the thickness of the lens 14 when combined with the total aberrations of the lens 14 as a whole.

In one embodiment, the processor 22 may be configured to determine the type and extent of optical aberrations based on comparison with wavefront data that is stored in the memory 24. The wavefront data may reflect a variety of deviations from a desired profile of the optical surface. A comparison of the wavefront received by the sensor 12 with the wavefront data may indicate the type and extent of optical aberrations of the optical surface. In one embodiment, the wavefront data may reflect a desired profile of the optical surface. The processor 22 may compare the wavefront received by the sensor 12 with the wavefront data to determine the degree to which the wavefront received by the sensor 12 deviates from the desired profile of the optical surface.

The processor 22 may be configured to make the determination of the one or more characteristics of the optical surface of the lens 14 on the opposite optical surface of the lens 14 as well, in a similar manner as described above. In a similar manner as with the first optical surface, the processor may be configured to reconstruct the profile of the opposite optical surface and provide the profile as an output.

In one embodiment, the processor 22 may be a component separate from the sensor 12. The processing by the processor 22 may be provided in a remote system, such as in a cloud computing configuration. In one embodiment, the processor 22 may be configured as a part of the sensor 12.

The system may be configured to transmit light through the lens 14. The light may be transmitted through the anterior optical surface 16 and the posterior optical surface 18. The transmitted light may be received by the sensor 12. In this manner, the one or more characteristics of the lens may be determined based on the wavefront of the light that is transmitted through the lens 14. The one or more characteristics may comprise aberrations of the entire lens, which may include a misalignment of the optical surface (anterior surface 16) with the opposite optical surface (posterior surface 18) (e.g., due decentration). Other aberrations of the entire lens include defects arising due to anterior surface defects, posterior surface defects, anterior or posterior decentration, anterior or posterior tilt, inhomogeneities (such as microvacuoles) inside the media, a variation in refractive index, and a different thickness than intended, among other aberrations.

In one embodiment, the light may be transmitted through the lens 14 by decreasing the intensity of the light lower than the intensity of light used to reflect off surface 16 and/or surface 18.

The one or more characteristics of the lens may be determined in a similar manner as with the optical surfaces (16, 18). Namely, the processor 22 may be configured to make the determination of the one or more characteristics of the lens 14 based on the wavefront of the transmitted light that is received by the sensor 12. The processor may be configured to provide the wavefront quality of the lens 14.

The system accordingly may be utilized to determine one or more characteristics of the anterior optical surface 16 of the lens, and the posterior optical surface 18 of the lens, and the lens 14 as a whole. The one or more characteristics of the anterior optical surface 16 of the lens, and the posterior optical surface 18 of the lens, and the lens 14 as a whole, may be determined separately and output separately. The profile of the anterior optical surface 16, the posterior optical surface 18, and the characteristics of the lens 14 as a whole may be provided. A user may accordingly determine if one or more of the surfaces of the lens 14, or the lens as a whole, is suitable for use, has had manufacturing defects, and/or needs to be corrected for desired use. The source of deviations in the lens may accordingly be pinpointed.

The optical quality of the anterior surface of the lens, the posterior surface of the lens, and the combined total lens can be provided.

Figure 2:
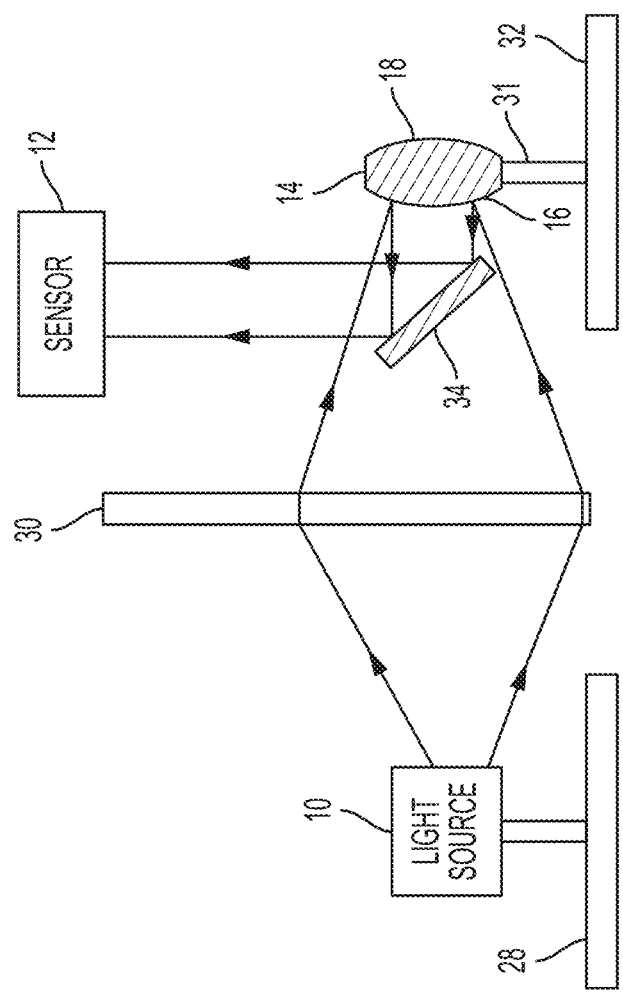
FIG. 2 illustrates a schematic view of a system according to an embodiment of the present disclosure.

FIG. 2 illustrates an embodiment of a system described above. FIG. 2 illustrates the light source 10 emitting light that is reflected off the anterior optical surface 16 of the lens 14. The reflected light is received by the sensor 12 for processing by the processor. The light source 10 may be configured as a point source, such as a laser. The light source 10 may be coupled to a rail 28. The rail 28 may allow for one-dimensional movement. In other embodiments, other degrees of movement (two-dimensional, three-dimensional) may be utilized. The light source 10 may move along the rail 28 to vary the position of the light source 10 relative to the lens 14. The varied position of the light source 10 may vary the angle of incidence of the light emitted by the light source 10 on the anterior optical surface 16 of the lens 14. The system may therefore account for varied shapes of the optical surfaces 16, 18 of various lenses 14 and different powers of lenses 14, and may result in the desired reflection of light based on the shape of those surfaces 16, 18. Preferably the light source 10 is a point source formed at a focal distance to the lens. For example, if the lens 14 is more curved, then the light source 10 should be closer to the lens 14.

The position of the light source 10 may be varied such that the light after reflection is close to a planar wave. This may give a higher validity of aberration measurements. The defocus induced by having a point source may be readily estimated by the positioning of the point source. In one embodiment, a point source may be created by, for example, having an incoming planar wave focused by a lens with a variable position, or two lenses (allowing close to planar wavefronts).

A lens 30 (which may be referred to as auxiliary lens 30) may be provided optically between the light source 10 and the lens 14. The auxiliary lens 30 may serve to refract or otherwise direct the light emitted by the light source 10 such that the light is incident on the surface 16 at a desired angle of incidence. In one embodiment shown in FIG. 2, the auxiliary lens 30 serves to converge the wavefront of the light emitted by the light source 10 optically prior to the light being reflected off the optical surface 16 of the lens 14. The convergence of the wavefront accounts for the convex shape of the anterior optical surface 16 of the lens 14. In one embodiment, the auxiliary lens 30 may serve to diverge the wavefront in an embodiment in which the surface 16 is concave. In one embodiment, the auxiliary lens 30 may be excluded. For example, if the shape of the surface 16 is planar, the auxiliary lens 30 may not be utilized.

The lens 14 may be coupled to a retainer 31. The retainer 31 may hold the lens 14 in a desired position during the measurement process. The retainer 31 may comprise a clamp, a housing, a clip, or other form of retainer. In one embodiment, the retainer 31 may comprise a wet cell. In one embodiment, the retainer 31 may be configured to rotate the lens 14 relative to the light emitted by the light source 10 such that the posterior optical surface 18 faces and reflects the light emitted by the light source 10. This would allow the characteristics of the posterior optical surface 18 to be measured in the manner described above. In one embodiment, the lens 14 may be held upright, or may be laying down (with the path of the light coming from above).

Figure 4:
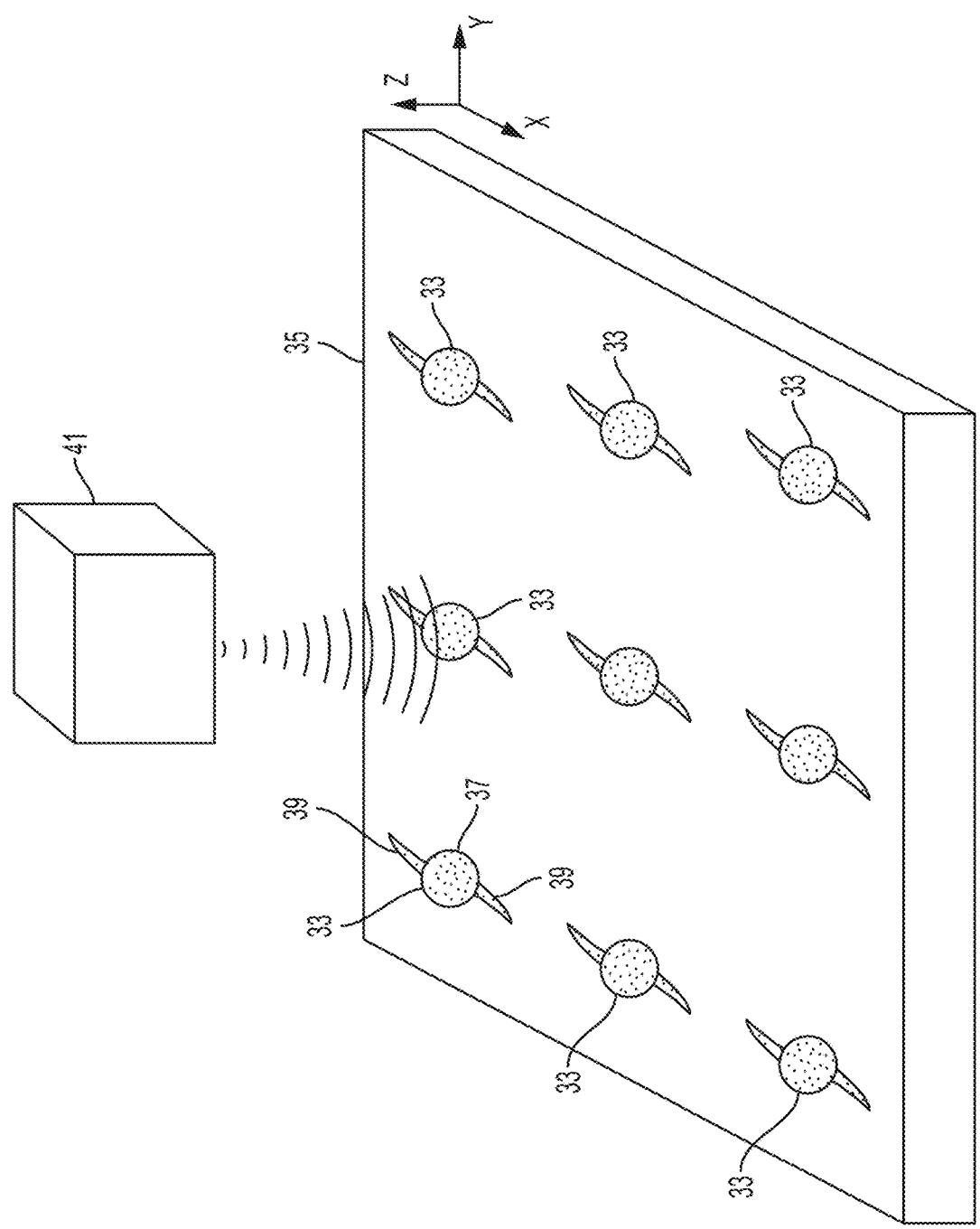
FIG. 4 illustrates a side perspective view of a system according to an embodiment of the present disclosure.

In one embodiment, a plurality of lenses may be held in a tray (the tray comprising the retainer) for large-scale measurement of each lens. FIG. 4 illustrates such an embodiment with multiple lenses 33 coupled to a retainer in the form of tray 35. The lenses 33 may include optics 37 and haptics 39 coupled thereto. The whole tray may be moved to reposition each individual lens into the measurement system. The light source and sensor may be combined into a single housing 41 for measuring the properties of the lenses. The embodiment shown in FIG. 4 may incorporate any of the features disclosed in regard to the other embodiments of this application.

Referring back to FIG. 2, the lens 14 may be coupled to the rail 32. The rail 32 may allow for one-dimensional movement. In other embodiments, other degrees of movement (two-dimensional, three-dimensional) may be utilized. The lens 14 may move along the rail 32 to vary the shape of the wavefront of the reflected light. Preferably, the lens 14 is positioned such that a plane reflected wave (having eliminated defocus) is provided by the lens 14 to be received by the sensor 12. In an embodiment in which tray testing of the lenses is performed, the system may be configured such that three dimensional movement of the tray and lenses therein (z direction for appropriate defocus, x and y for shifting between different lenses) may be performed.

A beam splitter 34 may be provided to reflect the light that is reflected by the anterior optical surface 16 to the sensor 12. The beam splitter 34 may be positioned in the optical path between the light emitted by the light source 10 and the lens 14.

The sensor 12 is positioned such that it does not receive any light that may be transmitted through the lens 14, to allow for measurement of one or more optical characteristics of the optical surface 16.

The posterior optical surface 18 of the lens 14 may be measured in a similar manner as described above. The lens 14 may rotate such that the posterior optical surface 18 faces the light emitted by the light source 10 to reflect light. The light source 10 may also be moved to emit light that is reflected off the posterior optical surface 18. Other methods (multiple light sources 10 and/or sensors 12, or varying the optical path of the light source's 10 light (via mirrors or the like), among others) may be utilized.

The processor may be configured to determine one or more characteristics of the anterior optical surface 16 of the lens 14 and/or of the posterior optical surface 18 of the lens 14 based on the wavefront of the reflected light that is received by the sensor 12, in the manner described above.

The system shown in FIG. 2 may be configured to transmit light through the lens 14. The light source 10 may transmit light through the lens 14. The sensor 12 may be configured to receive the light transmitted through the lens 14. In this manner, the system may produce a determination of one or more characteristics of the lens 14 based on the wavefront of the transmitted light that is received by the sensor 12, in the manner described above. The same system may perform both the reflection and transmission aberrometry. The sensor 12 may be moved or the light path may otherwise be diverted such that the sensor 12 receives the light transmitted through the lens 14.

The system accordingly may provide the profile of the anterior optical surface 16, the posterior optical surface 18, and the characteristics of the lens 14 as a whole.

Upon the lens 14 being tested, it may be removed from the system. Another lens may be placed in the system for testing.

In one embodiment, the processor 22 may be configured to utilize an algorithm to automatically position the lens 14 or a component of the system to account for a shape of either surface of the lens 14. The algorithm may operate on a feedback system based on the amount of light received by the sensor 12. The algorithm may be stored in memory 24 for use by the processor 22. In one embodiment, the processor 22 may be coupled to motors or servos or the like for automatically moving one or more of the components disclosed herein to perform a process, such as a measurement process, disclosed herein. For example, processor 22 may be configured to move one or more of the light source 10, lens 14, sensor 12, or light path between such components by operation of a motor or servo. The processor 22 may be configured to move one or more components along a rail or may be configured to move a tray such as the tray shown in FIG. 4. The measurement processes disclosed herein may be automated through use of a processor.

The measurements disclosed herein may be performed in air.

In one embodiment, the apparatuses, systems, and methods disclosed herein may be utilized to perform in vivo testing of lenses. The proper vergence of the incident wavefront may be provided for the anterior side.

Figure 5:
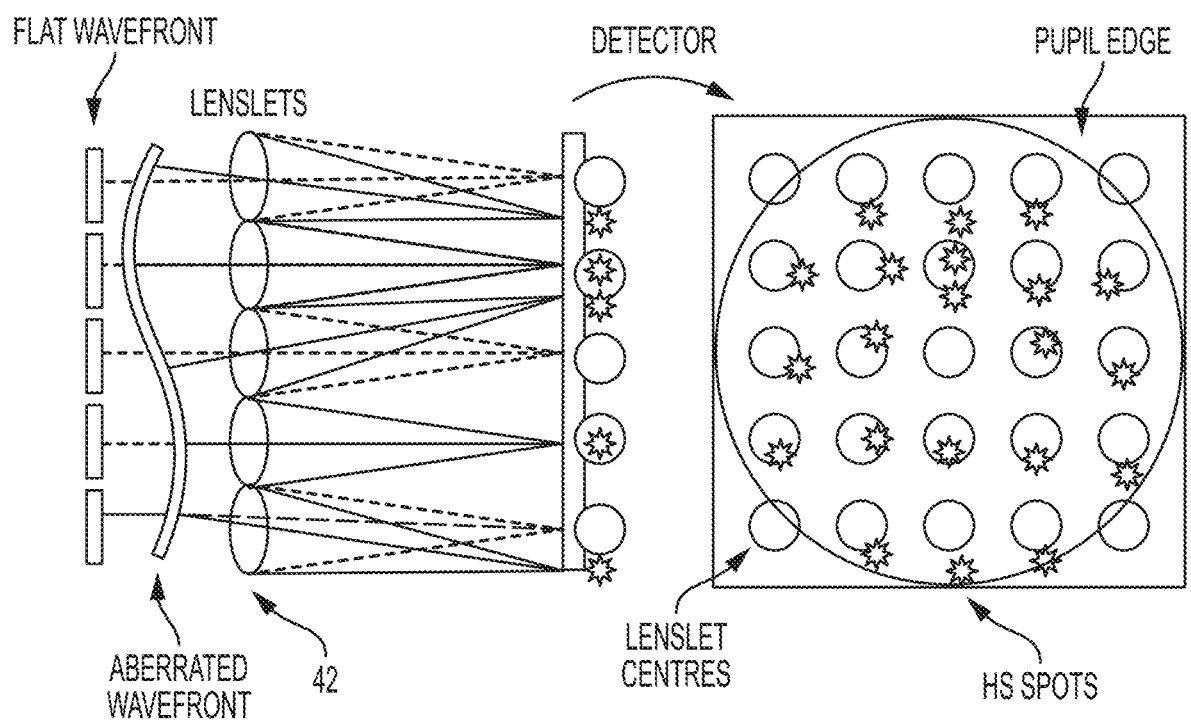
FIG. 5 illustrates a representation of a Hartmann-Shack wavefront sensor.

The scope of this disclosure additionally extends to methods of determining optical characteristics of diffractive lenses. Wavefront sensors have been used to characterize optical quality of diffractive lenses. One such sensor is a Hartmann-Shack sensor including a plurality of lenslets (the Hartmann-Shack sensor and its operation may be used to perform the wavefront aberrometry disclosed herein). Properties of such a sensor are shown in FIG. 5. The lenslets 42 pass a wavefront therethrough. If the wavefront is a plane wave, then each lenslet 42 focal point is directly behind the lenslet. For an aberrated wavefront, the focus will deviate based on the slope, as shown in FIG. 5. The deviation may be translated into a slope, which is then integrated to a wavefront map that can be decomposed into (e.g.) Zernike polynomials. This method may be used both in vivo to characterize patients, and in vitro to characterize optical quality of (e.g.) intraocular lenses.

Figure 6A:
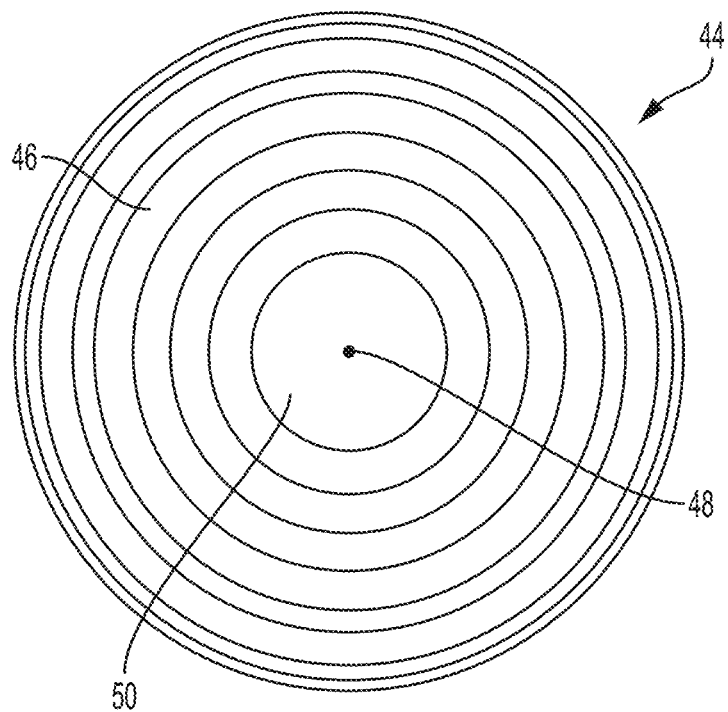
FIG. 6A illustrates a front view of a diffractive lens.
Figure 6B:
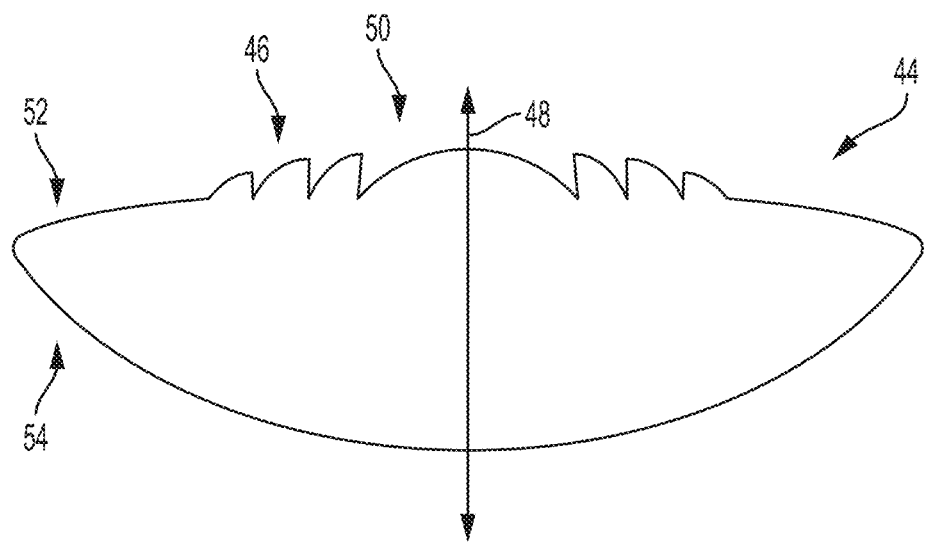
FIG. 6B illustrates a side cross sectional view of the diffractive lens shown in FIG. 6A.

Referring to FIGS. 6A and 6B, diffractive lenses have been developed that diffract incident light to diffractive orders. Such diffractive lenses 44 may have a plurality of diffractive zones or echelettes 46 that extend around an optical axis 48 of the lens 44. A central portion 50 of the lens 44 may be centered on the optical axis 48. The diffractive profile produced by the echelettes may be disposed on the posterior optical surface 52 of the lens 44 as shown in FIG. 6B, or the anterior optical surface 54 of the lens 44, or both surfaces.

Figure 7:
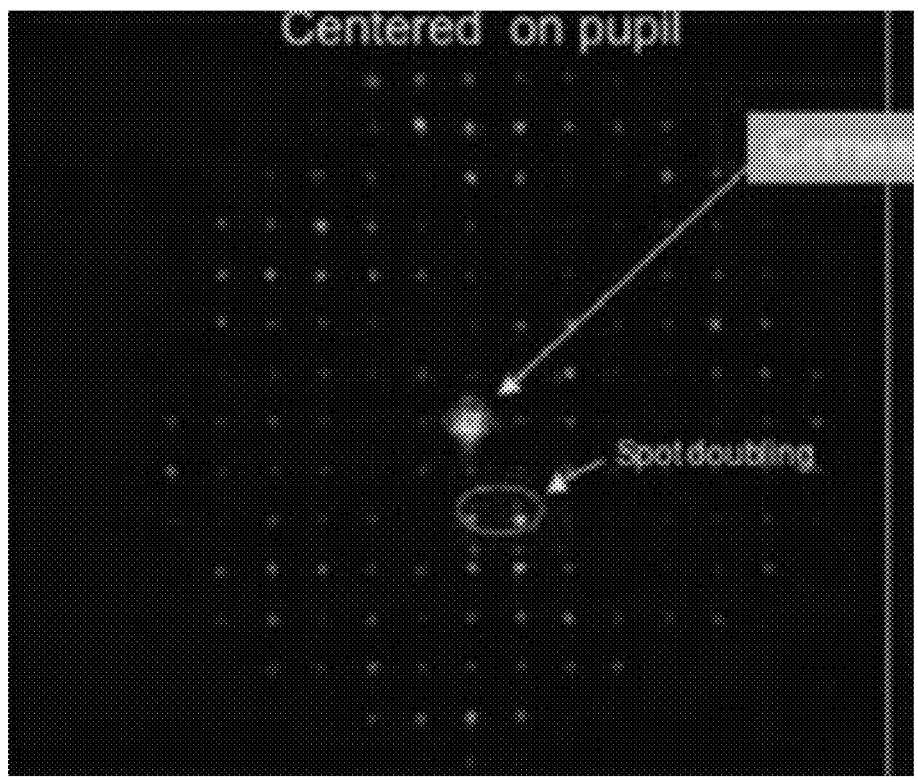
FIG. 7 illustrates a representation of spot doubling on a wavefront sensor.

The presence of diffractive orders with diffractive lenses may increase the difficulty of wavefront aberrometry (such as the wavefront aberrometry described in regard to FIG. 5). Referring to FIG. 7, if the diffractive lens 44 has more than a single diffractive order, then multiple spots may be produced on the wavefront sensor. The multiple spots may make it difficult to accurately measure the wavefront and characterize the aberrations of the diffractive lens 44.

A system is disclosed herein to address the difficulties in determining wavefront aberrations of diffractive lenses.

Figure 8:
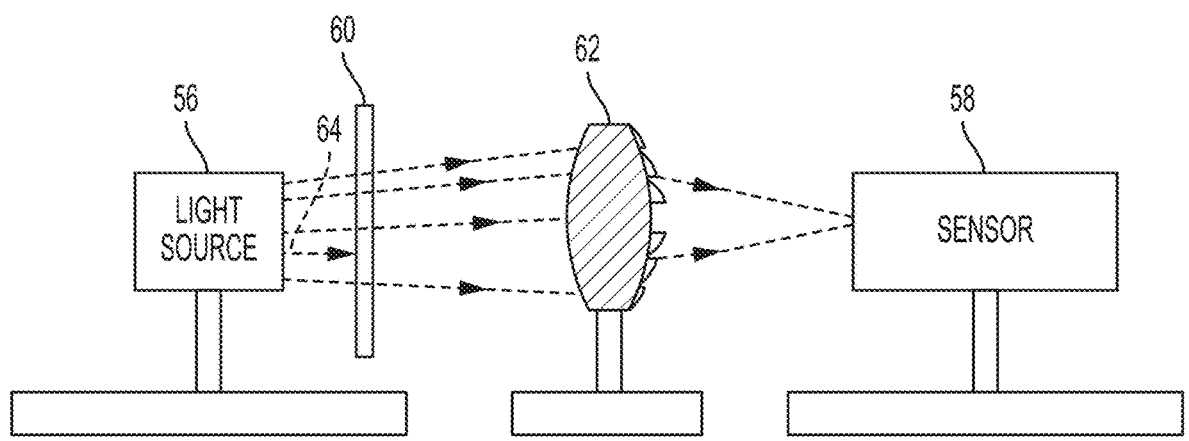
FIG. 8 illustrates a side schematic illustration of a system according to an embodiment of the present disclosure.

Referring to FIG. 8, a system may include one or more light sources 56 and may include a light sensor in the form of wavefront sensor 58. The one or more light sources 56 may comprise a laser, a multi-wavelength lamp, a light emitting diode (LED), a super-luminescent diode, a tungsten source, a halogen lamp, a plasma light source, or other form of light source. In the embodiment shown in FIG. 8, a single light source 56 is utilized. The single light source 56 may comprise a multi-wavelength lamp. In other embodiments, multiple light sources may be utilized, each emitting light at a different wavelength. The multiple light sources may comprise lasers or the like, each emitting light at a different wavelength.

In the embodiment shown in FIG. 8, one or more filters 60 may be utilized to filter wavelengths of light provided by the single light source 56. The filters 60 may allow a desired wavelength of light to pass to the diffractive lens 62. Reference number 64, for example, represents a wavelength of light that does not pass through the filter 60. Different filters 60 allowing different wavelengths of light to pass through may be substituted for each other or used in combination with each other in accordance with the operation of the system.

The wavefront sensor 58 may comprise a Hartmann-Shack wavefront sensor, or a wavefront curvature sensor, one or more interferometers, or a Ronchi test, or other forms of sensors.

The wavefront sensor 58 may be positioned such that the wavefront sensor 58 receives the light emitted by the light source 56 that is diffracted by the lens 62. The light may pass through the lens 62. In other embodiments, the light may be diffracted and reflected off the diffractive surface of the lens 62. The wavefront sensor 58 may be configured to receive the light that is reflected off the diffractive surface of the lens 62. The wavefront sensor 58 may utilize the systems, apparatuses, and methods disclosed in regard to FIGS. 1-4 to receive light that is reflected off the diffractive surface of the lens 62.

A diffractive lens 62 may be positioned such that it diffracts the light emitted by the light source 56.

The one or more light sources 56 may be configured to apply a plurality of wavelengths of light to the diffractive lens 62. The plurality of wavelengths of light are preferably applied to the diffractive lens 62 such that a single wavelength or range of wavelengths is applied at any given time. The applied wavelengths may be selected to test the diffractive efficiency of the diffractive lens 62 at those wavelengths. For example, a wavelength of 640 nanometers (nm) may be selected to be applied to the diffractive lens 62. The 640 nm wavelength may be applied to the diffractive lens 62 to the exclusion of other wavelengths. In the embodiment shown in FIG. 8, one or more filters 60 may be utilized such that the 640 nm wavelength is applied to the diffractive lens 62 to the exclusion of other wavelengths. In another embodiment, a light source only emitting 640 nm may be applied to the diffractive lens 62. A defined range of wavelengths (e.g., 620-660 nm) may also be applied to the exclusion of other wavelengths.

The wavefront sensor 58 may be configured to detect that only a single spot is produced by the lenslet, and the intensity of these spots, from the light diffracted by the diffractive lens 62 at the single wavelength or range of wavelengths. The sensor 58 accordingly provides a measure of the diffractive efficiency of the diffractive lens 62 at the single wavelength or range of wavelengths.

The one or more light sources 56 may then apply a single wavelength or range of wavelengths to the diffractive lens 62 that differs from the previously applied single wavelength or range of wavelengths. The wavefront sensor 58 may correspondingly detect the pattern (e.g., number of spots) and intensity of the light diffracted by the diffractive lens 62 at the single wavelength or range of wavelengths. This method may iteratively proceed at a plurality of different wavelengths. In this manner, the diffractive efficiency of the diffractive lens 62 may be determined at a plurality of wavelengths. The diffractive order corresponding to the wavelength may be determined. If the design of the diffractive lens 62 is known, then theoretical prediction may be used to select an initial wavelength, whereafter fine-tuning may be used to find the optimum wavelength. Then the diffractive order may be known. In an situation where the diffractive order is initially not known, then an algorithm may be utilized. The algorithm may utilize the pattern (e.g., number of spots) and intensity of the light. If readings were performed at multiple wavelengths, then all peaks in the curve may be found, and may be matched with potential theoretical levels, to determine the diffractive order.

The diffractive efficiency of the diffractive lens 62 at a plurality of wavelengths may be utilized to determine a peak diffraction efficiency for the diffractive lens 62. The peak diffractive efficiency is a diffractive efficiency at a peak. The peak diffractive efficiency may be at a wavelength that reduces the presence of light from the other diffractive orders such that aberrometry may be effectively performed. The peak may be at or close to 100% for a single diffractive order. A best possible wavelength to perform aberrometry at may be determined. In one embodiment, the peak diffraction efficiency may be determined by the light source 56 scanning through the plurality of wavelengths, with only a single wavelength or range of wavelengths applied to the diffractive lens 62 at one time.

In an embodiment involving multifocal diffractive lenses, the position of the wavefront sensor 58 may be moved relative to the lens 62 according to the position of the focal length of the diffractive order. The wavefront sensor 58 and/or lens 62 may be coupled to a rail, such as a rail disclosed in regard to FIG. 2, or another structure, to move the wavefront sensor 58 and/or lens 62.

Figure 9:
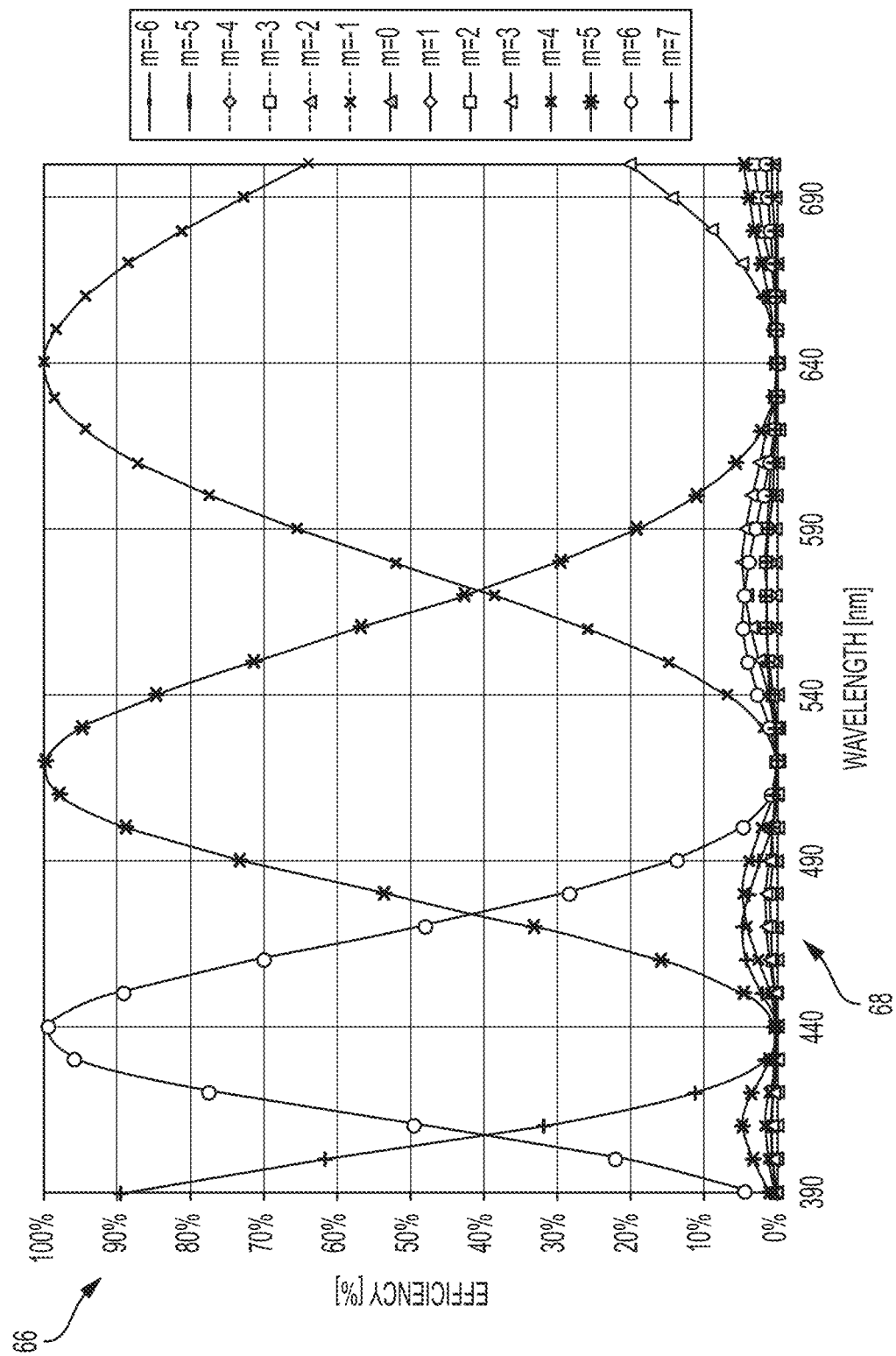
FIG. 9 illustrates a diffraction efficiency chart according to an embodiment of the present disclosure.

The peak diffraction efficiency may be presented in a chart, as shown in FIG. 9. FIG. 9 illustrates diffraction efficiency 66 on the vertical axis of the chart, and wavelength 68 on the horizontal axis of the chart. The diffraction efficiency is shown for a plurality of diffractive orders of the diffractive lens 62 (e.g., m=−6 through m=7). The diffractive efficiency is shown to peak at 440 nm, 520 nm, and 640 nm.

Figure 10:
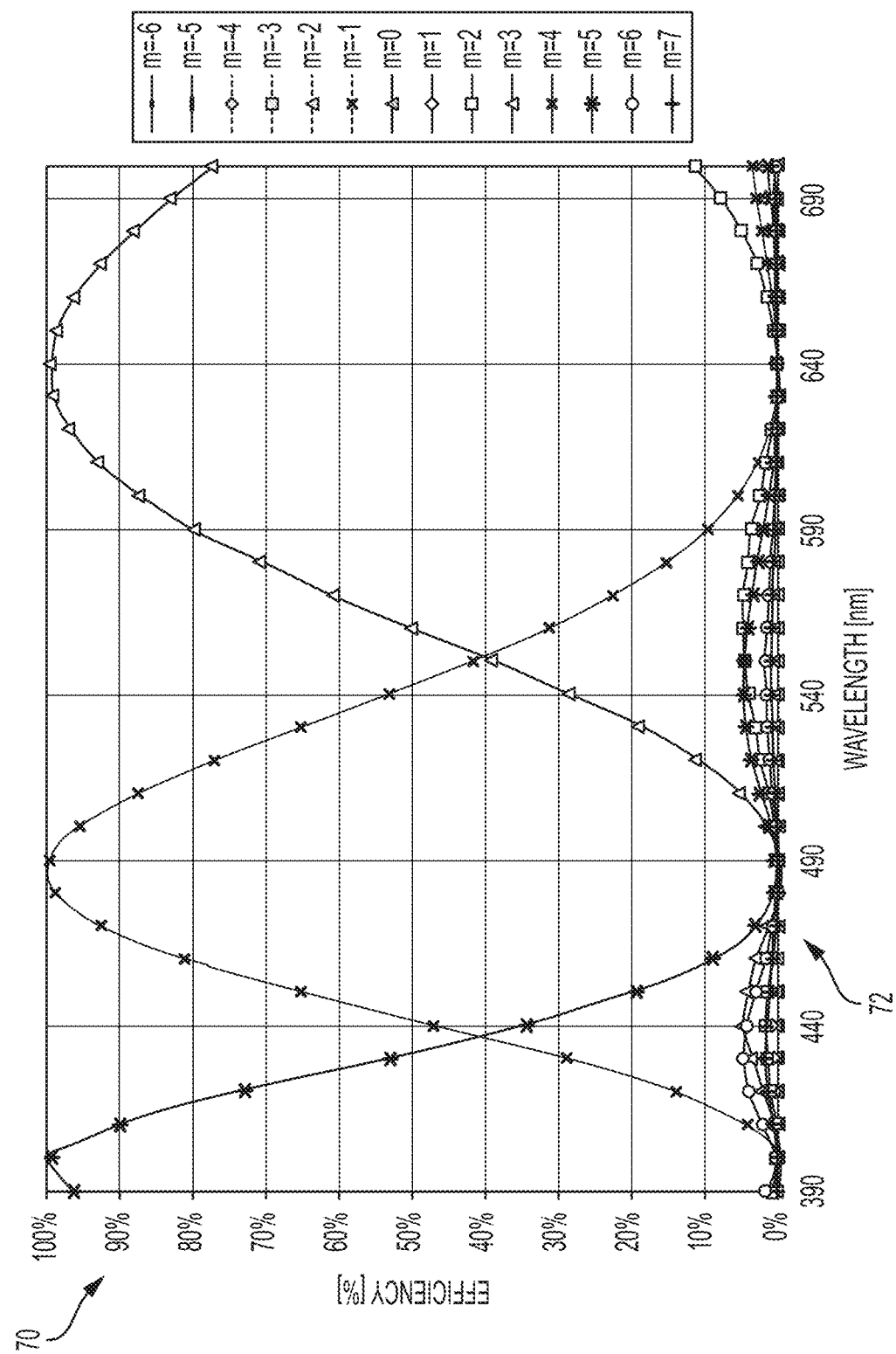
FIG. 10 illustrates a diffraction efficiency chart according to an embodiment of the present disclosure.

FIG. 10 illustrates an alternative representative chart of diffraction efficiency. FIG. 10 illustrates diffraction efficiency 70 on the vertical axis of the chart, and wavelength 72 on the horizontal axis of the chart. The diffraction efficiency is shown for a plurality of diffractive orders of a monofocal achromat diffractive lens (e.g., m=−6 through m=7). The diffractive efficiency is shown to peak at 400 nm, 490 nm, and 640 nm.

A processor may be utilized to determine one or more of the plurality of wavelengths applied to the diffractive lens 62 that have a peak diffraction efficiency for the diffractive lens 62 based on the light received by the wavefront sensor 58. The processor may comprise the processor 22 shown in FIG. 3 (although it may be a separate processor, or the same processor, as used in the embodiments of FIGS. 1-4). Referring to FIG. 3, the processor 22 may be used in combination with a memory 24 and an input 26 (each of which may be a separate memory and input, or the same memory and input, as used in the embodiments of FIGS. 1-4). The memory 24 may store data for use by the processor 22 in the operation of the system. The input 26 may comprise an interface between the wavefront sensor 58 and the processor 22 (e.g., a port or connector or the like). The processor 22 may determine the one or more of the plurality of wavelengths applied to the diffractive lens 62 that have a peak diffraction efficiency by processing the information produced by the wavefront sensor 58 regarding the intensity of light received. The processor 22 may be configured to produce a chart or other form of output indicating the peak diffraction efficiencies.

In one embodiment, the processor 22 may be a component separate from the sensor 58. In one embodiment, the processor 22 may be configured as a part of the sensor 58. The processing by the processor 22 may be provided in a remote system, such as in a cloud computing configuration.

The processor 22 may be configured to perform the steps disclosed in regard to FIGS. 5-10.

The peak diffraction efficiencies may be utilized to determine a wavelength at which to perform aberrometry for the diffractive lens 62. The problems inherent in performing aberrometry for a diffractive lens are reduced if the aberrometry is performed at a wavelength that produces intense light at only one diffractive order. Thus, the likelihood of measuring double spots (as represented in FIG. 7) is reduced. Preferably, a single spot is produced.

In one embodiment, the determination of the peak diffraction efficiencies may be determined through calculation alone, without physical measurement of the diffractive lens 62. In one embodiment, the determination of the peak diffraction efficiencies may be determined by reference to theoretical peak diffractive efficiencies based on known optical design. In one embodiment, a Bayesian method may be used to determine the peak diffraction efficiencies.

Multiple peak diffractive efficiencies may be determined. For example, in FIG. 9, peaks occur at 440 nm, 530 nm, and 640 nm. The selection of the wavelength at which to perform aberrometry may be selected from the peaks as desired. The determination of peak diffraction efficiencies may occur through testing in air.

A wavefront aberration of the diffractive lens 62 may be determined via wavefront testing of the diffractive lens 62 at a wavelength corresponding to the peak diffraction efficiency. The corresponding wavelength utilized may vary slightly from the wavelength of peak diffractive efficiency. The wavefront testing may performed such that all light from the light source 56 may go into a single diffractive order. The wavefront testing is preferably is performed in air.

In one embodiment, the sensor 58 may be configured as a wavefront sensor, to perform the wavefront aberration testing. The light source 56 may be used as the light source for the wavefront aberration testing. The processor 22 may be used to determine the wavefront aberration of the diffractive intraocular lens based on the light received by the sensor 58.

In one embodiment, the wavefront testing may occur at multiple peak diffraction efficiency wavelengths, with the final wavefront determined at the varied peak diffraction efficiency wavelengths. This method may be preferred if different parts of the diffractive lens have different diffraction profiles.

The wavefront testing may occur either in vivo or in vitro as desired. The measurement in vivo however, may differ from those determined in vitro, and thus separate testing may be necessary in vivo compared to in vitro.

In one embodiment, the wavefront testing may be utilized to plan refractive surgery for a patient already implanted with a diffractive lens.

In one embodiment, the apparatuses, systems, and processes disclosed in regard to FIGS. 5-10 may be combined with or used in lieu of the apparatuses, systems, and processes disclosed in regard to FIGS. 1-4. For example, in an embodiment in which the diffractive lens 62 includes a refractive optical surface (e.g., opposite the diffractive optical surface), then the apparatuses, systems, and processes disclosed in regard to FIGS. 1-4 may be utilized to characterize the refractive optical surface via the disclosed reflection testing. In addition, the characteristics of the lens 62 as a whole may be determined by transmitting light through the diffractive lens 62 at a wavelength corresponding to peak diffractive efficiency, which may be determined via a process disclosed in regard to FIGS. 5-10. The characteristics of the diffractive surface, the refractive surface, and the lens 62 as a whole may accordingly be provided and determined separately. In one embodiment, aberrometry may be performed by reflecting light off of a diffractive surface of the lens 62 in a manner disclosed in regard to FIG. 1-4. The diffractive techniques disclosed in regard to FIGS. 5-10 may accordingly be combined with the reflection techniques disclosed in regard to FIGS. 1-4 to determine optical quality of the lens.

In one embodiment, the apparatuses, systems, and processes disclosed in regard to FIGS. 5-10 may be utilized in large-scale testing of lenses, which may include a tray embodiment disclosed in regard to FIG. 4.

The apparatuses, systems, and methods disclosed herein are not limited to being applied to or used with an intraocular lens. Other forms of lenses, including ophthalmic lenses, may be utilized, including contact lenses or spectacle lenses, among other forms of lenses.

The apparatuses, systems, and methods disclosed herein may be combined, or performed separately from each other as desired to produce a desired result. For example, the methods of FIGS. 1-4 may be performed separately from the methods of FIGS. 5-10.

The processor 22 disclosed herein may be utilized to perform or automate the processes disclosed herein. The processor 22 may include computer hardware and/or software, which may include one or more programmable processor units running machine readable program instructions or code for implementing some or all of one or more of the methods described herein. In one embodiment, the code is embodied in a tangible media such as a memory (optically a read only memory, a random access memory, a non-volatile memory, or the like) and/or a recording media (such as a floppy disk, a hard drive, a CD, a DVD, a memory stick, or the like). The code and/or associated data and signals may also be transmitted to or from the processor 22 via a network connection (such as a wireless network, an Ethernet, an internet, an intranet, or the like), and some or all of the code may also be transmitted between components of the system and within the processor 22 via one or more bus, and appropriate standard or proprietary communications cards, connector, cables, and the like can be included in the processor 22.

The processor 22 is preferably configured to perform the calculations and signal transmission steps described herein at least in part by programming the processor 22 with the software code, which may be written as a single program, a series of separate subroutines or related programs, or the like. The processor 22 may include standard or proprietary digital and/or analog signal processor hardware, software, and/or firmware, and has sufficient processing power to perform the calculations described herein. The processor 22 optionally includes a personal computer, a notebook computer, a tablet computer, a proprietary processing unit, or a combination thereof. Standard or proprietary input devices (such as a mouse, keyboard, touchscreen, joystick, etc.) and output devices (such as a printer, speakers, display screen, etc.) associated with computer systems may also be included in the system, and additional processors having a plurality of processing units (or even separate computers) may be employed in a wide range of centralized or distributed data processing architectures.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A system for measuring diffractive lenses comprising: one or more light sources configured to emit a plurality of wavelengths of light for diffraction by a diffractive intraocular lens; a wavefront sensor configured to receive the light that is diffracted by the diffractive intraocular lens; and a processor configured to determine one or more of the plurality of wavelengths that have a peak diffraction efficiency for the diffractive intraocular lens based on the light received by the wavefront sensor.

2. The system of claim 1, wherein the one or more light sources comprise a plurality of light sources each configured to emit light at different one of the plurality of wavelengths.

3. The system of claim 2, wherein the plurality of light sources each comprise a laser.

4. The system of claim 1, wherein the one or more light sources includes a single light source emitting multiple of the plurality of wavelengths.

5. The system of claim 4, further comprising one or more filters for filtering wavelengths of light emitted by the single light source.

6. The system of claim 1, wherein the processor is configured to determine the one or more of the plurality of wavelengths that have the peak diffraction efficiency based on the pattern or the intensity of light received by the wavefront sensor.

7. The system of claim 1, wherein the processor is configured to determine the one or more of the plurality of wavelengths that have the peak diffraction efficiency based on the number of spots received by the wavefront sensor.

8. The system of claim 7, wherein the processor is configured to determine a wavefront aberration of the diffractive intraocular lens based on the light received by the wavefront sensor.

9. The system of claim 8, wherein the processor is configured to determine the wavefront aberration of the diffractive intraocular lens at the one or more of the plurality of wavelengths that have a peak diffraction efficiency for the diffractive intraocular lens.

10. A method comprising: applying a plurality of wavelengths of light to a diffractive intraocular lens; receiving light that is diffracted by the diffractive intraocular lens with a wavefront sensor; and determining one or more of the plurality of wavelengths of light that have a peak diffraction efficiency for the diffractive intraocular lens based on the light received by the wavefront sensor.

11. The method of claim 10, wherein applying the plurality of wavelengths includes emitting light from a plurality of light sources to an optical surface of the diffractive intraocular lens.

12. The method of claim 11, wherein each of the plurality of light sources emits a different wavelength of light.

13. The method of claim 10, wherein applying the plurality of wavelengths includes emitting light from a single light source emitting multiple of the plurality of wavelengths.

14. The method of claim 13, further comprising filtering the wavelengths of light emitted by the single light source.

15. The method of claim 10, further comprising determining multiple of the plurality of wavelengths of light that have a peak diffraction efficiency for the diffractive intraocular lens based on the light received by the wavefront sensor.

16. The method of claim 10, further comprising determining the one or more of the plurality of wavelengths that have the peak diffraction efficiency based on the number of spots or intensity of spots received by the light sensor.

17. The method of claim 10, wherein determining the one or more of the plurality of wavelengths of light that have the peak diffraction efficiency for the diffractive intraocular lens includes a Bayesian method.

18. The method of claim 10, further comprising determining a wavefront aberration of the diffractive intraocular lens based on the light received by the wavefront sensor.

19. A method comprising: determining a wavefront aberration of a diffractive intraocular lens at a wavelength corresponding to a peak diffraction efficiency for the diffractive intraocular lens.

20. The method of claim 19, further comprising applying the wavelength to the diffractive intraocular lens with a light source.

* * * * *